US007158487B1

United States Patent
Klaghofer et al.

(10) Patent No.: US 7,158,487 B1
(45) Date of Patent: Jan. 2, 2007

(54) MULTIMEDIA TERMINAL FOR TELEPHONY ALLOWING MULTIPOINT CONNECTIONS

(75) Inventors: Karl Klaghofer, München (DE); Markku Korpi, Starnberg (DE); Werner Remmele, Mering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/441,535

(22) Filed: Nov. 16, 1999

(30) Foreign Application Priority Data

Nov. 16, 1998 (DE) ................. 198 52 782
Dec. 21, 1998 (DE) ................. 198 59 145

(51) Int. Cl.
*H04L 12/16* (2006.01)
*G10L 19/02* (2006.01)
*H04L 12/66* (2006.01)

(52) U.S. Cl. .................. 370/261; 370/352; 709/204
(58) Field of Classification Search ........ 370/351–356, 370/401, 410, 259–263; 709/204–205; 379/202.01–207.01
See application file for complete search history.

(56) References Cited

U.S. PATENT DOCUMENTS 5,689,553 A * 11/1997 Ahuja et al. ........... 379/202.01
5,828,838 A * 10/1998 Downs et al. ............. 709/204
5,922,047 A * 7/1999 Newlin et al. ............. 709/217
5,963,547 A * 10/1999 O'Neil et al. ............. 370/260
6,011,579 A * 1/2000 Newlin .................. 379/93.21
6,105,068 A * 8/2000 Naudus .................... 709/228
6,163,531 A * 12/2000 Kumar .................... 370/260
6,167,033 A * 12/2000 Chang et al. ............. 370/263
6,205,124 B1 * 3/2001 Hamdi .................... 370/260
6,380,968 B1 * 4/2002 Alexander et al. ....... 348/14.05
6,457,043 B1 * 9/2002 Kwak et al. .............. 709/204

OTHER PUBLICATIONS

Kyung Hee Lee, An implement of control potocol for multipoint Audio-Video teleconferencing systems, Jan. 23, 1998, IEEE, pp. 38-41.*
Gary Thom, H.323: The multimedia communications standar for LAN, Dec. 1996, IEEE, pp. 52-56.*

* cited by examiner

*Primary Examiner*—Steven Nguyen
(74) *Attorney, Agent, or Firm*—Laurence A. Greenberg; Werner H. Stemer; Ralph E. Locher

(57) ABSTRACT

A multimedia terminal for telephony based on the ITU-T Standard H.323 sets up multipoint connections to a plurality of other terminals. The multimedia terminal has a controller for processing signaling information for point-to-multipoint connections and has a mixer for mixing datastreams originating at the terminals involved in the multipoint connection and for providing datastream mixtures to these terminals.

12 Claims, 2 Drawing Sheets

MULTIMEDIA TERMINAL FOR TELEPHONY ALLOWING MULTIPOINT CONNECTIONS

BACKGROUND OF THE INVENTION

Field of the Invention

The invention relates to a multimedia terminal for telephony allowing multipoint connections to a plurality of other terminals.

Multipoint connections between a plurality of subscribers to a communication network are known as conference circuits controlled by a central conference circuit control provided in the communication network. In this context it is known to provide multipoint control units (MCU) in a communication network. In the case of a multipoint connection that uses such multipoint control units, terminals each have a point-to-point connection to the multipoint control unit. This multipoint control unit performs a multipoint function called multipoint processing. This involves handling the datastreams of the individual point-to-point connections, with other datastreams coming from the individual terminals being mixed together and the mixture which is produced in each case being transmitted to the individual terminals. Such a procedure is for example described in the ITU-T Standard H.323, Section 6.8.1, under the term "centralized conference".

Multipoint communication using a decentralized control, in which a multipoint controller is provided only for processing multipoint signaling, is also known. Such a decentralized multipoint control can be implemented in a terminal or a multipoint control unit, for example. For this multipoint communication, each of the terminals involved transmits the useful information to a multicast address, which is determined by the multipoint controller. The multipoint controller assigns a plurality of different multicast addresses and notifies each terminal of a multicast address for the information it has to transmit. Each terminal thus transmits to a special multicast address and receives the information transmitted to the other multicast addresses assigned by the multipoint controller. To this end, all the terminals involved need to support multicast functions. As an alternative to using multicast, a so-called multi-unicast can also be provided. For this multi-unicast method, the terminals use multiple point-to-point connections to transmit each of the datastreams to be transmitted to the other terminals involved in the multipoint connection.

Such a communication principle is, for example, described in the ITU-T Standard H.323, Section 6.8.2, under the term "decentralized conference". In order to establish a multipoint communication using a decentralized controller or control based on this standard, on the basis of an existing call between a first subscriber A and a second subscriber B, the following conditions must be fulfilled:

At least one of the subscribers A and B must have a terminal with a multipoint controller, or an available gatekeeper must have a multipoint controller.

All the terminals involved must support multicast functions or multi-unicast functions.

A gatekeeper is a logic function for performing standard functions such as address resolution or bandwidth management. In this context, address resolution means that a calling endpoint transmits to the gatekeeper a so-called alias address for an endpoint which is to be called, and receives from the gatekeeper the transport address, that is to say the Internet protocol address and the port number. The gatekeeper knows the volume of traffic with respect to real-time applications within the network area for which it is responsible.

In addition, the subscriber A or B who is starting a consultation call with a further subscriber C while a call is being made between subscribers A and B must usually determine, when this consultation call is actually being set up, whether the subscriber C to be consulted is to be included in the call between subscribers A and B through the use of a multipoint connection.

The different ways of setting up a multipoint connection using a centralized control or a decentralized control, as described above, do not allow a three-subscriber conference to be set up flexibly on the basis of a two-subscriber call with a consultation call.

SUMMARY OF THE INVENTION

It is accordingly an object of the invention to provide a multimedia terminal which overcomes the above-mentioned disadvantages of the heretofore-known terminals of this general type and which allows a multipoint communication between terminals to be set up flexibly.

With the foregoing and other objects in view there is provided, in accordance with the invention, a multimedia terminal for telephony based on ITU-T Standard H.323 for setting up a multipoint connection to a plurality of terminals, including a controller for processing signaling information for a point-to-multipoint connection between the multimedia terminal and a plurality of terminals; and a mixer, connected to the controller, for mixing datastreams originating at the multimedia terminal and at the plurality of terminals and for providing datastream mixtures to the plurality of terminals.

In accordance with another feature of the invention, the mixer provides to each respective one of the plurality of terminals a respective one of the datastream mixtures, which includes a mixture of the datastreams originating at the multimedia terminal and at a respective other one of the plurality of terminals.

With the objects of the invention in view there is also provided, a multimedia terminal, including a function module for setting up a multipoint connection to a first terminal and to a second terminal based on ITU-T Standard H.323; a controller, connected to the function module, for processing signaling information for a point-to-multipoint connection between the multimedia terminal, the first terminal, and the second terminal; and a mixer, connected to the controller, for mixing datastreams originating at the multimedia terminal, at the first terminal, and at the second terminal and for providing datastream mixtures to the first terminal and to the second terminal.

In accordance with a further feature of the invention, the mixer provides to the first terminal a respective one of the datastream mixtures including a mixture of the datastreams originating at the multimedia terminal and at the second terminal.

The invention achieves its object through the use of a novel multimedia terminal for telephony based on the ITU-T Standard H.323 for producing multipoint connections to a plurality of other terminals. Such a terminal has a controller or, in more general terms, a control for processing a signaling for point-to-multipoint connections. It also contains a device for mixing datastreams originating from terminals involved in the multipoint connection and for providing datastream mixtures to these terminals.

The controller or control for processing a signaling information for point-to-multipoint connections allows point-to-point connections to a plurality of other terminals to be set up simultaneously. In addition, this control allows to establish a point-to-multipoint connection configuration which, with the help of the device for mixing datastreams originating from the terminals involved in the multipoint connection and for providing datastream mixtures to these terminals, functions or operates as a multipoint-to-multipoint connection for all the terminals involved.

Point-to-point connections can be set up using the regular setup message based on ITU-T H.323, for example. If there are already one or more point-to-point connections between a terminal according to the invention and remote endpoints, these connections can be put into a "hold" state before a new point-to-point connection is established by using a "near end hold" or "far end hold" message based on the ITU-T Draft Recommendation H.450.4. The point-to-point connection to a further terminal can then be made using a conventional setup message based on ITU-T H.323, for example. When a conference connection is established between all the terminals to which there are point-to-point connections, the control of the multimedia terminal according to the invention transmits a facility message "ConferenceIndication.Invoke", for example, requesting that an existing conference circuit be indicated.

In a particular embodiment of a terminal according to the invention, this control or controller can also output control channel messages of the "MultipointConference"-type or the "CommunicationModeCommand"-type based on the ITU-T Standard H.242 and in particular ITU-T H.323V2, Appendix I.

The "CommunicationModeCommand" message can be output, for example, in order to cause a remote endpoint to which there is a point-to-point connection to close one transmission channel and open another transmission channel. One reason for this could be that an embodiment of a multimedia terminal according to the invention is not able to mix the output signals from different audio codecs. If one of the subscribers to an intended conference circuit now has only one codec based on ITU-T G.711 available, another subscriber can be requested to close a transmission channel for data coded on the basis of ITU-T G.723.1 and to change to another transmission channel for data coded on the basis of ITU-T G.711.

Another reason for outputting a "CommunicationModeCommand" message can be that the endpoints of a scheduled conference circuit are capable of multicasting. In this case, the "CommunicationModeCommand" message can contain the multicast addresses to which the endpoints are to transmit their useful information. In this application, the terminals at all the endpoints would have to be capable of receiving and mixing the datastreams before forwarding them to the appropriate subscriber. The mixing device of the terminal according to the invention would provide no datastream mixtures for the other endpoints.

Also, if the terminal according to the invention wishes to receive the datastreams from different endpoints via different addresses, an existing connection can be changed using the "CommunicationModeCommand" message, in order to establish a conference circuit. In this case, too, the "CommunicationModeCommand" message would be used to transmit to the endpoint, to which there is a point-to-point connection, the address to which information arriving from this endpoint is be transmitted.

In a further embodiment of a multimedia terminal according to the invention, the control for point-to-multipoint signaling may be set up to use the "TerminalCapabilitySet=0" message in order to close and to reopen logical channels based on the ITU-T Standard H.323V2, section 8.4.6 "Third Party Initiated Pause and Re-Routing". The "TerminalCapabilitySet" message is usually used by a terminal to notify another terminal of what communication possibilities or communication opportunities it has available. In this context, the limits of these possibilities can be determined both, technically—due to hardware or software not being available—and, alternatively, by defined authorizations. In order to initiate an existing useful data connection between two terminals, the control can transmit, for example to each of these terminals, a "TerminalCapabilitySet" message which implies that the respective other terminal has no communication possibilities or communication opportunities available. The two terminals recognize these messages as a message transmitted by the respective other terminal. Since each of these terminals has been informed that the terminal, to which there are logical channels open, has no communication possibilities available, these logical channels are switched off or disconnected.

The device for mixing datastreams originating from the terminals involved in the multipoint connection and for providing datastream mixtures to these terminals allows a conference circuit to be established on the basis of a plurality of point-to-point connections between a multimedia terminal according to the invention and other terminals. In this case, the other terminals require no particular multipoint functionality or multitask functionality.

In a preferred embodiment of a multimedia terminal according to the invention, the device for mixing provides each of the terminals involved in the multipoint connection with a datastream mixture of datastreams originating from the other terminals involved in the multipoint connection. This ensures that each of the terminals involved in a multipoint connection receives the information from all the other terminals.

Other features which are considered as characteristic for the invention are set forth in the appended claims.

Although the invention is illustrated and described herein as embodied in a multimedia terminal for telephony allowing multipoint connections, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
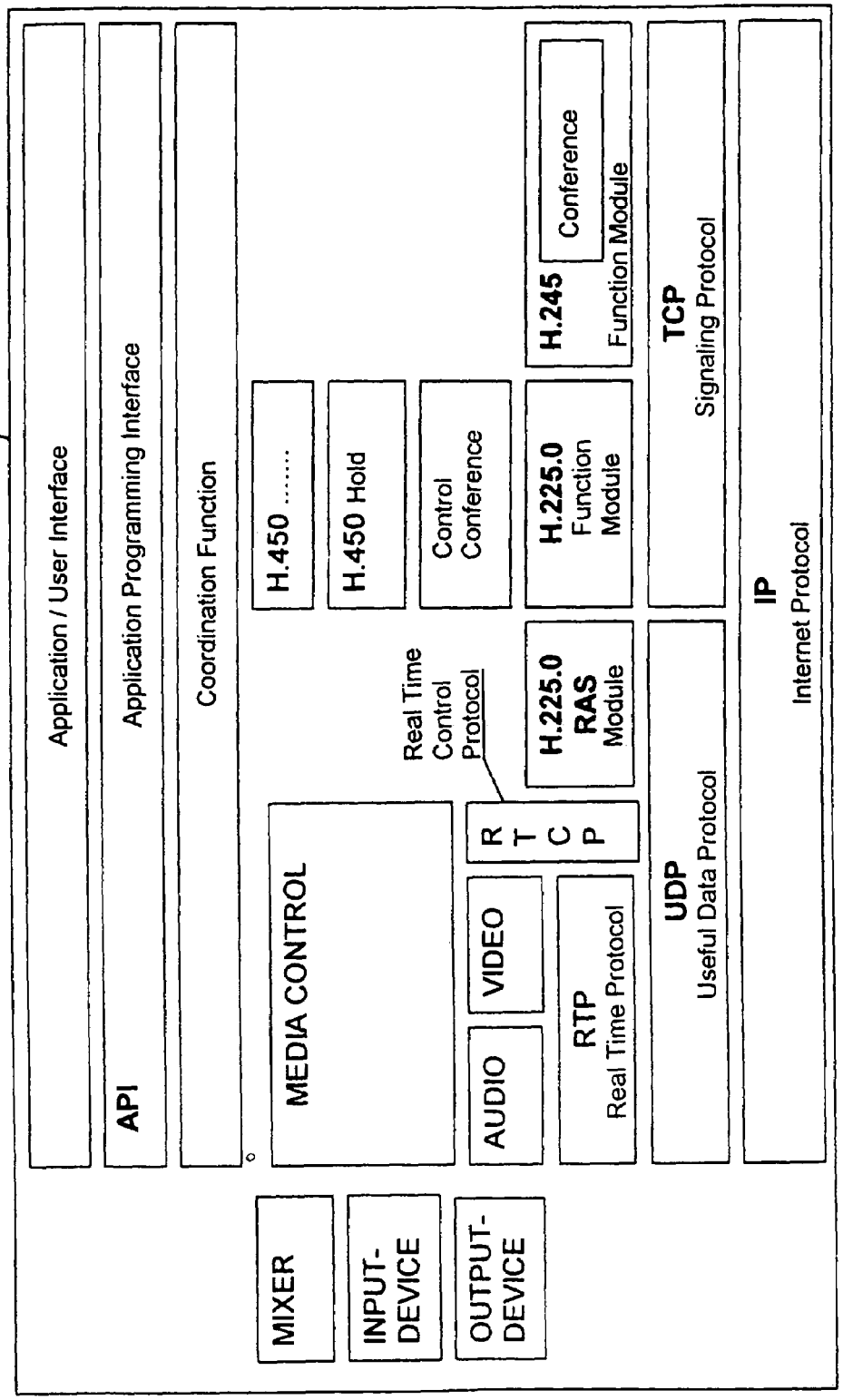
FIG. 1 is a block diagram of an expanded protocol layer model (protocol stack) of an exemplary embodiment of a multimedia terminal according to the invention.

Referring now to the figures of the drawings in detail and first, particularly, to FIG. 1 thereof, there is shown an exemplary embodiment of a multimedia terminal MM-terminal according to the invention in a schematic block diagram in the form of its expanded protocol layer model. As is usual in networks based on ITU-T H.323, the communication of the terminal MM-terminal is based on the Internet protocol IP. Taking the Internet protocol IP as a basis, the right-hand side of FIG. 1 shows the protocol stack for the signaling, which handles the call control.

In this case, on the basis of the Internet protocol IP and the signaling protocol TCP, a function module H.225.0 based on the ITU-T Protocol H.225.0 is provided for a basic call control signaling in H.323 networks. Exemplary messages for this function module H.225.0 are SETUP or CONNECT.

Also, on the basis of the signaling protocol TCP, there is a function module H.245 based on the ITU-T Control Protocol H.245. This function module H.245 is used, among other things, for exchanging "TerminalCapability" messages, that is to say for submitting and receiving information regarding terminal capabilities. This function module H.245 is also used for defining task distributions such as master and slave functions and for opening and closing logical channels used for useful data transmissions. The function module H.245 is also responsible for messages such as "Multipoint-Conference", "CommunicationModeCommand" or "EnableDecentralizedConference" in a network based on ITU-T H.323. These messages are necessary for the above-described methods for producing a multipoint conference and are optionally usable in a multimedia terminal according to the invention.

On top of the function module H.225.0, there are function modules of additional facility controllers or features controls, such as, according to the invention, the function module "CONTROL CONFERENCE", which corresponds to a controller or control for processing a signaling for point-to-multipoint connections within the context of the invention. As further function modules of additional facility controllers or feature controls, FIG. 1 shows, by way of example, a function module H.450 "HOLD" for producing or implementing a "HOLD" function based on ITU-T H.450, and a further function module H.450 having further variants, indicated by dots, based on the ITU-T Standard H.450.

FIG. 1 shows, on the left next to the signaling stack described above, a useful data stack. This useful data stack is also based on the Internet protocol IP, on which there is UDP and on that, in turn, a real-time protocol RTP. In addition to the real-time protocol RTP, the protocol UDP also supports a real-time control protocol RTCP and that part H.225.0 RAS of the control protocol according to ITU-T H.225.0 which concerns the areas of registration, administration, and status.

On the basis of the real-time protocol RTP, there are codecs or at least decoders for audio and video, which are denoted by AUDIO, VIDEO in FIG. 1. Such audio codecs AUDIO are configured according to one of the ITU-T Standards G.711, G.723.1, or G.728, for example. Audio decoders AUDIO are for example also defined by ISO MPEG4 standards. ISO MPEG4 also defines corresponding video decoders VIDEO. When decoders based on ISO MPEG4 are used, proprietary coders are possibly contained in a multimedia terminal MM-TERMINAL according to the invention.

The real-time control protocol RTCP and the codecs or decoders for audio and video AUDIO, VIDEO are controlled by a media controller MEDIA CONTROL which, among other things, is responsible for the interaction of media input devices INPUT-DEVICE and media output devices OUTPUT-DEVICE provided in the multimedia terminal MM-TERMINAL. In this respect, media input devices INPUT-DEVICE are, for example, cameras for video data, microphones for audio data or interfaces for data sources not included in the multimedia terminal MM-TERMINAL. In this context, output devices OUTPUT-DEVICE are, for example, a screen for video data, loudspeakers for audio data or interfaces for output devices not included contained in the multimedia terminal MM-TERMINAL, such as printers or bulk memories.

The media controller MEDIA CONTROL also controls a device for mixing datastreams originating from terminals involved in a multipoint connection and for providing datastream mixtures to these terminals. Such a mixing device, whose manner of operation has been described above, is illustrated in FIG. 1 by the reference symbol MIXER.

The described stack for useful data handling RTP, RTCP, H.225.0, AUDIO, VIDEO, and MEDIA CONTROL and the described stack for a signaling handling H.245, H.225.0, CONTROL CONFERENCE, H.450Hold, and H.450 are coupled to an application programming interface API via a coordination function COORDINATION FUNCTION. In this case, the coordination function COORDINATION FUNCTION coordinates the interaction of the units in this stack with the application programming interface API.

Examples of an application programming interface API are TAPI or CAPI. The application programming interface API serves as an interface between application programs or a user interface and the coordination function COORDINATION FUNCTION.

Figure 2:
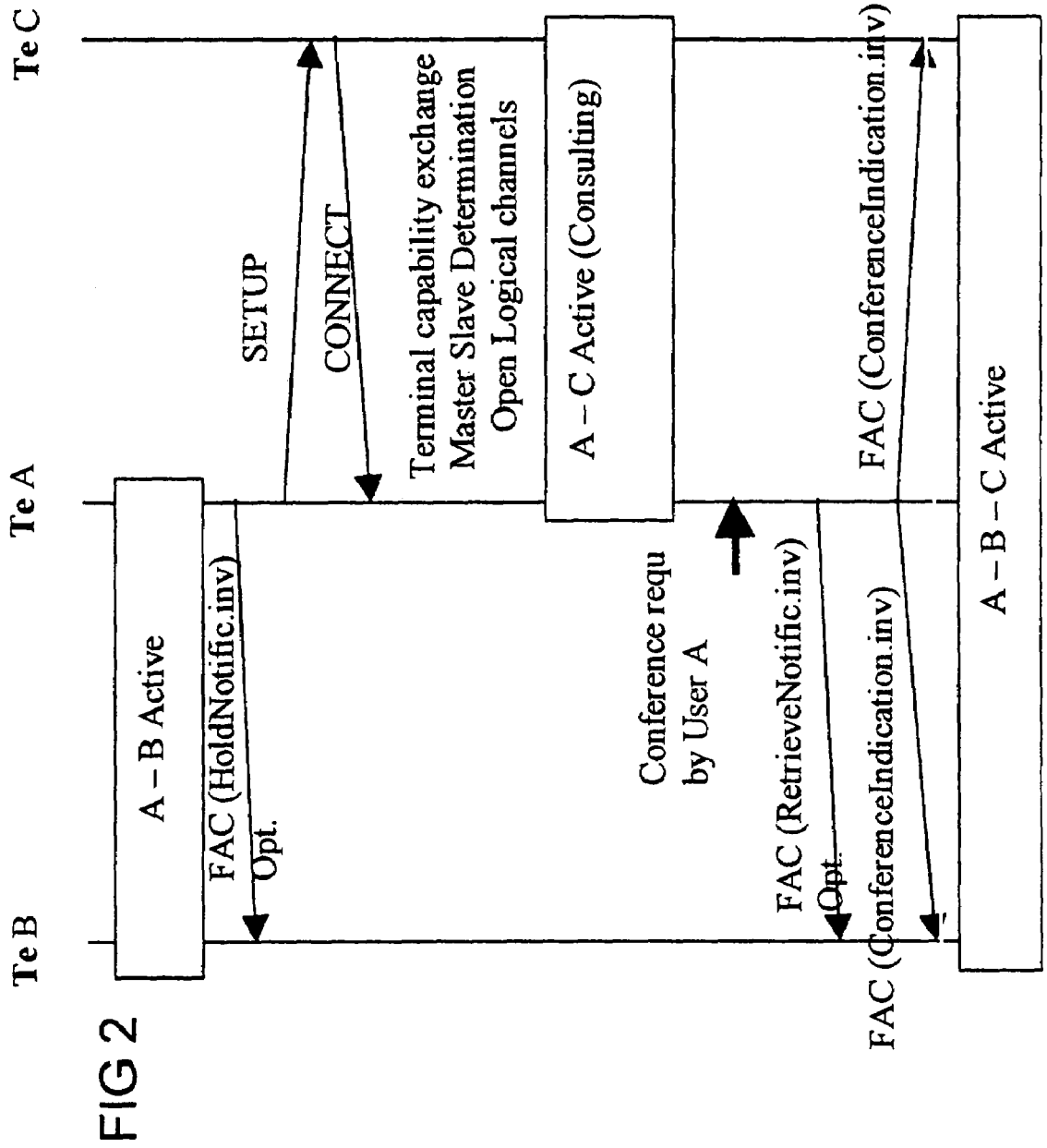
FIG. 2 is a message flowchart for setting up an ITU-T H.450 ad-hoc conference between three subscribers A, B, and C, with subscriber A using a multimedia terminal according to the invention.

In the initial state shown in FIG. 2, there is an active connection between the terminals TeA and TeB of two subscribers A and B. In this case, at least the terminal TeA is a multimedia terminal MM-TERMINAL, as shown in FIG. 1, to the extent that a function module CONTROL CONFERENCE is provided as a controller for a processing signaling for point-to-multipoint connections and a device MIXER for mixing datastreams originating from terminals involved in a multipoint connection.

The subscriber A sends a Setup message based on ITU-T H.323 from the terminal TeA to a terminal TeC of a subscriber C. In this case, as shown in FIG. 2, a facility message or feature message FAC(HoldNotification.inv) can optionally be transmitted from the terminal TeA of subscriber A to the terminal TeB of subscriber B in order to put the terminal TeB into the "hold" state.

The terminal TeC uses a Connect message to acknowledge to the terminal TeA the Setup message previously received from the latter. A consultation connection in the form of logical channels is then set up between the terminals TeA and TeC. If the subscriber A associated with the terminal TeA wants a conference circuit at this instant, the terminal TeA transmits a facility message FAC(Conference-Indication.inv) to each of the terminals TeB and TeC in order to indicate that a conference configuration is being called or selected. If, before a Setup message was transmitted to the terminal TeC, the terminal TeA had transmitted a message FAC(HoldNotific.inv) to the terminal TeB, the terminal TeB can be put back again into an active state from the "hold" state by a message FAC (RetrieveNotific.inv) received from the terminal TeA. The logical channels between the terminals TeA, TeB, and TeC, which were already open before the conference was started, continue to be used.

We claim:

1. A multimedia terminal for telephony based on ITU-T Standard H.323 for setting up a multipoint connection to a plurality of terminals, comprising:

a controller for processing signaling information for a point-to-multipoint connection between the multimedia terminal and a plurality of terminals; and a mixer, connected to said controller, for mixing datastreams originating at the multimedia terminal and at the plurality of terminals and for providing datastream mixtures to the plurality of terminals;

said controller, after receiving a connect message from one of said plurality of terminals, sets up a consultation connection in a form of logical channels with said one of said plurality of terminals.

2. The multimedia terminal according to claim 1, wherein said mixer provides to each respective one of the plurality of terminals a respective one of the datastream mixtures including a mixture of the datastreams originating at the multimedia terminal and at a respective other one of the plurality of terminals.

3. The multimedia terminal according claim 1, wherein said controller in conjunction with said mixer for providing the datastream mixtures, function as a multipoint-to-multipoint connection for all of said plurality of terminals.

4. The multimedia terminal according to claim 1, further comprising a media controller coupled to and controlling said mixer.

5. A multimedia terminal, comprising:
 a function module for setting up a multipoint connection to a first terminal and to a second terminal based on ITU-T Standard H.323;
 a controller, connected to said function module, for processing signaling information for a point-to-multipoint connection between the multimedia terminal, the first terminal, and the second terminal; and
 a mixer, connected to said controller, for mixing datastreams originating at the multimedia terminal, at the first terminal, and at the second terminal and for providing datastream mixtures to the first terminal and to the second terminal;
 said controller, after receiving a connect message from one of said plurality of terminals, sets up a consultation connection in a form of logical channels with said one of said plurality of terminals.

6. The multimedia terminal according to claim 5, wherein said mixer provides to the first terminal a respective one of the datastream mixtures including a mixture of the datastreams originating at the multimedia terminal and at the second terminal.

7. The multimedia terminal according to claim 5, wherein said controller in conjunction with said mixer for providing the datastream mixtures, function as a multipoint-to-multipoint connection for all of said plurality of terminals.

8. The multimedia terminal according to claim 5, further comprising a media controller coupled to and controlling said mixer.

9. A multimedia terminal for telephony based on ITU-T Standard H.323 for setting up a multipoint connection to a plurality of terminals, comprising:
 a controller for processing signaling information for a point-to-multipoint connection between the multimedia terminal and a plurality of terminals; and
 a mixer, connected to said controller, for mixing datastreams originating at the multimedia terminal and at the plurality of terminals and for providing datastream mixtures to the plurality of terminals;
 said controller being programmed to set up a connection between the multimedia terminal and at least one of said terminals by:
  said controller sending a setup message to said one of said terminals;
  said controller awaiting a connect message for acknowledging said one of said terminals receiving the setup message;
  said controller setting up a consultation connection in a form of logical channels between said controller and said one of said terminals; and
  said controller transmitting a facility message to each of said terminals for indicating that a conference configuration is being called.

10. The multimedia terminal according to claim 9, wherein said controller is programmed to keep using previously established logical channels formed between the multimedia terminal and any of said terminals after a new conference connection is requested by a further one of said terminals.

11. A multimedia terminal, comprising:
 a function module for setting up a multipoint connection to a first terminal and to a second terminal based on ITU-T Standard H.323;
 a controller, connected to said function module, for processing signaling information for a point-to-multipoint connection between the multimedia terminal, the first terminal, and the second terminal; and
 a mixer, connected to said controller, for mixing datastreams originating at the multimedia terminal, at the first terminal, and at the second terminal and for providing datastream mixtures to the first terminal and to the second terminal;
 said controller being programmed to set up a connection between the multimedia terminal and at least one of said terminals by:
  said controller sending a setup message to said one of said terminals;
  said controller awaiting a connect message for acknowledging said one of said terminals receiving the Setup message;
  said controller setting up a consultation connection in a form of logical channels between said controller and said one of said terminals; and
  said controller transmitting a facility message to each of said terminals for indicating that a conference configuration is being called.

12. The multimedia terminal according claim 11, wherein said controller is programmed to keep using previously established logical channels formed between the multimedia terminal and any one of said terminals after a new conference connection is requested by a further one of said terminals.

* * * * *